Sept. 27, 1927. R. L. HOLLIDAY Re. 16,749
MANUFACTURE OF A FINELY DIVIDED DRY SOAP PRODUCT
Original Filed April 19, 1926
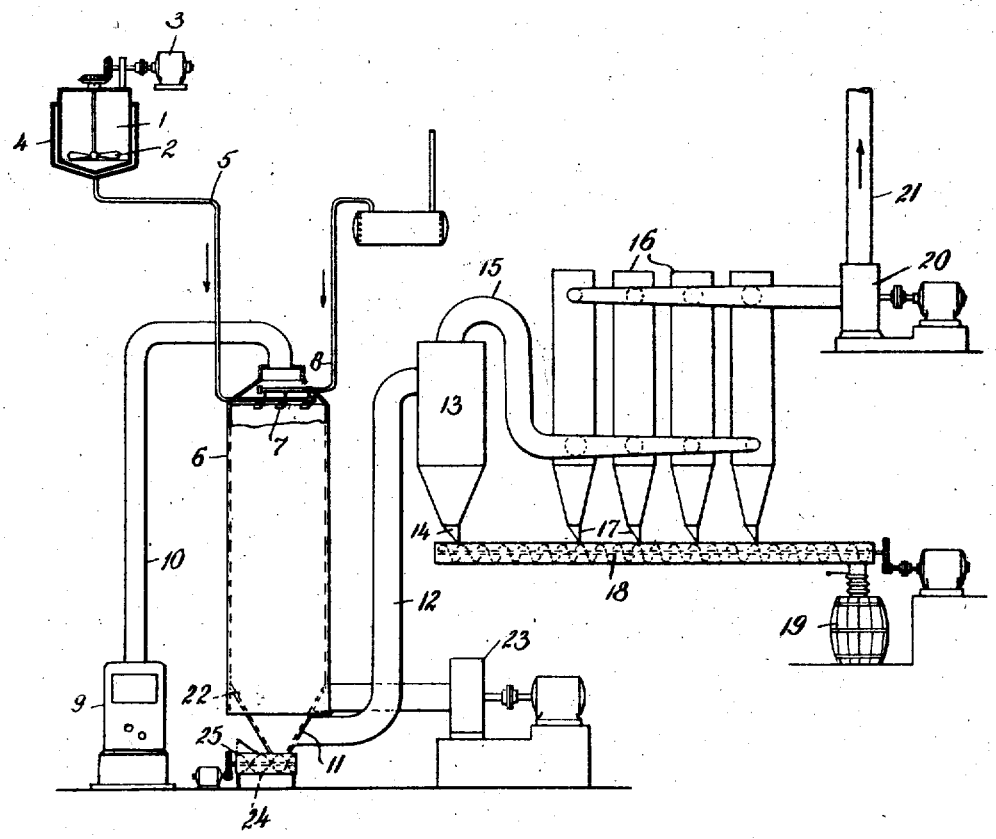
INVENTOR
Robert L. Holliday
BY
Davis Davis Mauro & Edwards
ATTORNEY Reissued Sept. 27, 1927. Re. 16,749

UNITED STATES PATENT OFFICE.

ROBERT L. HOLLIDAY, OF NEW YORK, N. Y., ASSIGNOR TO INDUSTRIAL SPRAY-DRYING CORPORATION, OF NEW YORK, N. Y., A CORPORATION OF DELAWARE.

MANUFACTURE OF A FINELY-DIVIDED DRY SOAP PRODUCT.

Original No. 1,621,506, dated March 22, 1927, Serial No. 102,860, filed April 19, 1926, and in Canada March 17, 1927. Application for reissue filed July 21, 1927. Serial No. 207,548.

The present invention relates to the manufacture of a finely divided dry soap product and has to do particularly with a manner of preparing the soap stock to render it suitable for conversion into dry form and the conversion of such stock into dry form in such a manner that all of the conditions of the process are subject to accurate control.

In the common process of soap manufacture the fats and oils are saponified by the action of a caustic alkali such as, for example, sodium-hydroxide. The usual practice is to cook or boil the fatty material in the presence of a proper amount of caustic material until the desired reactions have taken place. After the completion of the boiling operation and any other treatment which may be necessary, depending upon the character of the raw materials used, the kind of soap desired; etc., the hot semi-liquid soap paste is "crutched" to reduce it to a thoroughly mixed homogeneous mass and to incorporate uniformly into it any filler or added material which may be desired in the finished soap, after which the soap is placed in racks or frames where it remains until it solidifies. After solidification the blocks of soap are slabbed and cut into cakes, the cakes are surface dried to facilitate handling and the dried cakes are then pressed to put them in condition for packaging. In the manufacture of toilet soaps the dried cakes are usually chipped to reduce them to flake form and the flakes are milled with coloring matter, perfume, and the like, to produce a uniform homogeneous soap which is then "plodded" to convert it into a continuous bar which may be cut into cakes of any length and then stamped or pressed as desired.

A particular difficulty in the soap manufacturing process lies in effecting solidification of the soap. A period of days is required for solidification of the soap in bulk. In the manufacture of milled toilet soaps solidification of the boiled soap is sometimes facilitated by placing the soap mass on an endless belt which slowly conveys it through a drying chamber wherein air is circulated about the soap until it is reduced to solid form in condition for milling. In the production of soap flakes the soap stock is commonly solidified on rolls and scraped off or "ribboned" and dried. Different portions of the soap produced in this way show, in the ordinary manufacturing run, a rather wide variation in moisture content. In the ordinary processes the solidified soap is obtained in the form of cakes, blocks, fragments or flakes.

To effect solidification of the soap and to produce the ultimate soap product in finely divided form for use as powdered soap or for pressing into cakes it has been proposed to take the hot soap paste as it comes from the boiling kettles, break it up into finely divided condition and let it fall in this condition through the atmosphere until the particles or fragments of the soap paste are solidified. The action which takes place is largely a cooling and solidifying action, but some evaporation of moisture from the soap takes place by reason of its passage through the air and by reason of the contained heat of the soap itself. The difficulty with this process is that, in the short time available for solidification and with the conditions that are attained in practical operation, the soap does not, in fact, solidify satisfactorily and, although the initial soap paste or stock is as heavy as can reasonably be produced during the process of manufacture, the soap invariably masses and cakes in a moist condition and is not produced as a relatively fine powder composed of non-adhering particles. To aid in evaporating the liquid from the soap paste it has been proposed to subject the boiled soap to high pressure and to heat it at such pressure, before admitting it to atmospheric conditions, to a temperature well above its boiling temperature at atmospheric pressure. When this highly heated soap is released to atmosphere a certain amount of evaporation takes place due to the excess of sensible heat contained in the paste over that which it can contain at atmospheric pressure. This process, however, is subject to the disadvantages just noted and is not successful in the production of a powdered soap.

It has further been proposed to modify this process by introducing to the heated soap paste as it is released to atmospheric conditions a quantity of superheated steam or drying air for the purpose of effecting the necessary evaporation, and it has also been proposed to heat the air of the room or chamber into which the soap is sprayed to thus furnish an appropriate amount of heat to effect the desired evaporation. These latter proposals have not proven successful for the reason that the presence in the room of the moisture evaporated from the soap prevents satisfactory collection of the soap in the form of a dry powder, in addition to the fact that no systematic control of humidity conditions and consequent moisture content in the finished soap product is obtainable. It has further been proposed to disintegrate or break up soap paste drawn from the boiling kettles into relatively small fragments and to drop these fragments of soap paste against and through a rising current of air to effect solidification of the particles and thus to produce a dry soap product of granular nature made up of irregular particles or fragments. This process is open to a number of objections such as the fact that the heavier fragments pass through the apparatus in a shorter time and consequently with less drying treatment than do the lighter fragments with the result that different portions of the dried soap product contain rather widely different amounts of moisture, the loss of a large amount of the light soap fragments if the soap is disintegrated to reasonably fine condition and if any substantial amount of air is used, the variation of operating conditions due to changes in atmospheric conditions and the practical impossibility of successfully operating the process to satisfactorily produce a dry solid product under certain atmospheric conditions, such as on hot humid summer days. This process is not at all successful if an attempt is made to heat the treating air for the reason that the treated soap fragments contact with the air at its highest temperature at substantially the time they leave the apparatus so that it is practically impossible to collect the particles in solidified state unless their water content is reduced far below that which is desired in the finished soap.

It is a particular object of this invention to provide a process for the production of a powdered soap by which the soap can successfully be produced directly in the form of a dry, non-sticking powder of relatively small particle size and of reasonably regular particle shape and structure and having a moisture content which is readily controllable over a wide range amply covering all of the requirements of the various kinds of commercial soap products. This is accomplished in the present invention by the manner of preparing the initial soap stock and particularly by the method which is employed in reducing the soap stock to solid form.

The initial soap stock is prepared in free flowing condition rather than in the form of a heavy semi-liquid paste as is frequently done in the manufacture of soap. For instance, in a common method for the manufacture of soap the soap stock as it comes from the boiling kettles is, at say a temperture of 150° F., in semi-liquid condition and can not in a fair sense be said to be free flowing. In the present process the soap stock is prepared with a water content sufficiently high so that it is free flowing and in such condition that it may readily be broken up into a fine spray of liquid particles of relatively uniform size and structure so that a corresponding degree of reasonable uniformity and regularity of particle size and structure in the ultimate product is obtained. The spraying or disintegrating of the liquid soap is preferably conducted at temperatures of from 150° to 250° F., and it is under such temperature conditions that the soap stock should be in liquid free flowing condition. The essential requirement of this part of the process is that the soap be reduced to a condition which is sufficiently fluid to permit breaking up of the liquid mass into the form of a fine spray, the particles of which are essentially liquid particles of the same general order of magnitude in size and of regular generally spherical shape similar to the particles of a sprayed liquid as contrasted with the beaten up or shredded particles or fragments of a heavy semi-liquid paste wherein the particles are entirely irregular in shape and do not tend definitely toward any specific configuration.

After the soap stock has once been disintegrated in proper fashion it is important that it be treated in such manner as to produce the type of solid product desired and to permit of systematic and controllable variation of conditions so that the character of the ultimate product in turn may be controlled. The present process accomplishes the drying and the solidification of the soap particles under definitely controlled conditions while the particles are maintained in suspension in a gas. A number of requirements are necessary to accomplish these results. It is important that the particles of soap stock be treated in a current of circulating gas which carries away the moisture evaporated from the particles and flows in such fashion that, when continued operation of the apparatus has been established, the conditions of the process such as humidity, temperature, state of dryness of the soap particles, etc., at any given place in the drying tower are, for all practical purposes, substantially constant. It is also important that the current of gas in which the soap particles are treated be passed through the drying tower in a common direction of flow with the soap particles so that the particles are carried in and by the gas current and are thus positively propelled through and out of the apparatus in a definite and regular manner. With this arrangement the gas first contacts with the soap particles at substantially its highest temperature and last contacts with the solidified soap particles at substantially its lowest temperature. The particles under treatment are carried through the tower in a positive flow, and thus all of the particles remain in the drying tower for substantially the same length of time and are subjected to substantially identical treatment. With this condition existing the air current may be controlled and conditioned as to rate of flow, volume, temperature, moisture content, and the like, so that any desired variations in the ultimate product may be obtained by variation of one or all of these variables. The process also provides for removing the treated soap particles together with the gas which carries them, as well as the moisture contained in it, from the drying tower in intermixed condition so that collection of the dried particles may proceed as desired at a point removed from the hot drying tower. The collection problem is simplified by reason of the fact that all of the solids may pass out of the drying tower at one point. In the matter of conditioning the air current in which the soap particles are carried in suspension cooling gas may be admitted as desired along the length of the tower so that after the soap particles have been reduced to a desired moisture content they may also be suitably reduced in temperature to assure their production in non-sticking form whereby the soap product will be a finely divided regular apparently dry free flowing powder. The present process therefore provides for a uniform treatment of the particles of soap stock to produce a uniform product which may be controlled to possess within reasonable limits any desired moisture content and which may be successfully and easily produced commercially at all times and in all weather conditions in the form of an apparently dry solid easily handled powder product.

The accompanying drawing illustrates more or less diagrammatically an apparatus in which the present process may be carried out as a continuous operation. The soap stock, after having been produced in the usual course of the manufacture of the product and having been prepared with a sufficient amount of water to adapt it for treatment by the present process, is delivered to a tank 1 provided with an agitator 2 driven continuously by motor 3 for the purpose of maintaining the entire body of stock in a thoroughly mixed homogeneous condition. The tank 1 is steam jacketed as indicated at 4 for the purpose of maintaining the stock at a suitable temperature. The liquid stock from the tank 1 is passed through line 5 into the drying tower 6. The breaking up or spraying of the liquid stock into the form of small uniformly constituted particles is effected by means of spray nozzles 7 located in the upper part of the drying tower 6 and arranged about the tower in such fashion as to uniformly distribute the spray throughout the entire upper portion of the tower. In the apparatus here shown in the flow of soap to the nozzles 7 occurs due to gravity, and the breaking up of the material into the form of a spray is effected by means of atomizing air or steam supplied to the nozzles 7 as indicated at 8. The drying gas consists of atmospheric air which is heated in the furnace 9 and is then passed into the upper portion of the drying tower 6 through a passage or duct 10. The furnace 9 may, for instance, be oil fired and the air passing through it may be heated by causing it to pass along one side of heat transferring surfaces which on the other side are heated by direct contact with the products of combustion. The heated air entering the upper portion of the tower contacts with the atomized soap liquid issuing from the spray nozzles 7 at substantially its hottest temperature and, while drying of the soap particles is taking place, the drying air, the soap particles entrained therein and the moisture absorbed in the air pass downwardly through the drying tower in a common direction of flow and pass out of the tower at the discharge opening 11 in intermixed condition. This discharge stream of material passes through duct 12 into collector 13, here shown as an ordinary cyclone collector, wherein the collected solids are discharged through the hopper 14, and the effluent gas passes out through the duct 15. The residual solids entrained in the gas issuing from collector 13 are collected in bag collectors 16, the solids being discharged through the hoppers 17 at the bottom of the collectors. A conveyor 18, which may be a screw conveyor, a pneumatic conveyor, or the like, is provided to receive the solids coming from the collectors and convey them continuously into the barrel or other package or storage reservoir 19. The flow through the entire apparatus is established by means of a motor operated fan 20 positioned at the discharge side of the bag collector 16 and passing the gas drawn from the collectors to atmosphere through stack 21.

The particles of the sprayed liquid are carried in positive flow through the tower 6 by the drying gas, and thus every particle is subjected to the drying treatment for substantially the same length of time. Conditions in the tower are controlled by regulating the temperature and amount of the soap material passed into the tower and the temperature and amount of drying air supplied to the tower. This, together with the concurrent flow of materials through the tower, effects a positive control of temperature and humidity conditions in the tower and permits the production of a uniform product of any desired moisture content. To further control the temperature conditions in the tower and particularly to restrict the evaporating action at the point where the moisture content of the soap particles has been reduced to a desired amount and for the purpose of cooling the dried particles to such extent as to render their collection in dry powder form feasible, a supply of cooling air may be admitted to the tower as indicated at 22. The tower may be designed for the admission of this cooling air at any one or more points along the length of the tower and, by way of example in the apparatus here shown, the cooling air is admitted near the bottom of the tower and consists of atmospheric air introduced by means of the power driven blower 23. In some instances it may be feasible to condition this air, as, for instance, by heating to a certain degree before admitting it to the tower. At the bottom of the tower 6 below the discharge opening 11 is a motor driven disintegrator 24 designed to receive any agglomerates or heavy particles which may possibly be formed in commercial operation. Such heavy particles will not be drawn into the duct 11 but will drop into the disintegrator 24 where they will be immediately broken up and caught in the air current which is drawn into the disintegrator through the opening 25. This apparatus furnishes a means for carrying out the present process as a continuous operation which requires no manual handling of the material from the initial raw stock to the finished powder product and, for that matter, to package form ready for shipping.

As an instance of a specific embodiment of the process which has been employed successfully in the manufacture of a powdered soap the following conditions are given: An ordinary boiled borax laundry soap was used. The soap stock was prepared hot, its temperature as passed to the spray nozzles being about 220° F. The stock was prepared with about 10% solids. At this temperature and with this solid content the mixture was very fluid. In fact, a materially less amount of water and a lower preheating temperature can readily be used without reducing the soap mixture to a consistency so thick as to be objectionable. For economy of operation it is the best practice to preheat the liquid soap stock to as high a temperature as feasible and to prepare it with as low a water content as will permit the ready handling and breaking up of the material into a suitable spray, these conditions, of course, being regulated so as to be compatible with obtaining the desired qualities in the finished product and, avoiding injury to the product. There is always a sufficient range between the moisture content of the material as sprayed and that of the finished soap for the reason that toilet soaps, laundry soaps and the like, usually contain only about 12% water in their commercial form. The physical factor which determines the amount of solids which can be present in the soap as sprayed is the possibility of spraying or disintegrating the soap liquid into a proper spray. With an adequate preheating temperature soap stocks having a solid content as high as 30% to 40% may under certain conditions be successfully handled. The best results in reducing the soap stock to a proper spray have been obtained in an air or steam atomizing nozzle designed to produce an umbrella-like spray. The object is to secure a finely divided uniform spray distributed uniformly across the space within the walls of the tower without substantial contact with the walls. The initial air temperature employed was 350° F., and the temperature in the tower after drying of the material was substantially complete was 180° F. The initial air temperature is, of course, subject to a certain amount of variation depending on the relative amounts of air and liquid supplied to the tower, the amount of moisture desired in the ultimate product, and the like. The final temperature is in a sense dependent on the product and must be sufficiently low so that the product will not melt or be reduced to gummy or sticky condition. The reduction in temperature between the upper and lower portions of the drying tower is due largely to the evaporation of the moisture from the material under treatment. In the specific instance herein referred to a small quantity of atmospheric air was employed as a cooling medium.

The soap product produced under the conditions just stated is a light free-flowing apparently dry powder. It is uniform in appearance, is of uniform texture, is soft to the feel and exhibits complete freedom from particles of grit when rubbed between the fingers. When dropped into a pan of water the product is readily dissolved without caking or lumping by a slight agitation, and it readily floats on the surface of the water.

The particles of the soap as they appear under the microscope tend generally toward spherical form although more or less distortion from this form is present in most of the particles. The particles are generally hollow and may roughly be described as heavy walled soap bubbles from which the moisture has been removed so that the bubbles assume a solid substantially dry form.

The substance of the particles is amorphous and continuous. Each particle is a unitary mass of material in contrast to a particle which is granular and which may be broken up into its composite parts. When the particles of the present product are disintegrated under the microscope they break up into irregular fragments or plate-like pieces somewhat in the nature of the broken fragments of dried egg shells. The particle structure is analogous to that of hollow glass particles or bubbles in which the material of the particle is continuous and when disintegrated breaks up into fragments which are obviously broken out of a continuous mass which is itself unitary and is not in any sense an aggregate of component particles.

The present invention therefore provides a process for successfully producing commercially a dry, uniform, free flowing, floating, non-caking powdered soap, which process is continuous, requires a minimum of labor, makes possible accurate control of all conditions which affect the character of the product and is flexible in the sense that different sets of conditions can be established in continuous operation to thereby produce different grades of product.

I claim:

1. The process of manufacturing a soap product in powder form which comprises preparing a soap stock in the condition of a reasonably free flowing liquid, spraying the said soap stock to present it in the form of a uniformly distributed liquid spray made up of small liquid drops of the same general order of magnitude in size and of generally globular form as in the case of true liquids as distinguished from the irregular fragments of a disintegrated pasty material, entraining the drops of the sprayed soap stock in a downwardly flowing current of heated drying gas which positively carries and propels the said drops and the particles of soap resulting therefrom downwardly through the apparatus in like manner and direction of flow until uniform drying thereof is complete and separating and collecting the particles of the finished soap product from the said current of drying gas.

2. The process of manufacturing soap in powder form which comprises preparing the soap in the form of a free flowing liquid stock, evaporating moisture from the liquid stock by spraying it in the form of fine drops into the initial portion of a current of heated drying gas which entrains substantially all of the said liquid drops and positively carries the said drops and the soap particles resulting therefrom along through the apparatus in like manner of flow while evaporation is taking place, whereby the said particles remain in suspension in the gas current until the moisture content thereof is reduced to the desired value and then separating the said particles from the gas current and collecting them to form a powdered soap product.

3. The process of producing a finely divided powdered soap product which comprises compounding the ingredients of the product to form a relatively free flowing stock, spraying the said soap stock in the form of small independent drops into a current of heated drying gas at substantially the hottest portion thereof to thereby effect drying of said drops, positively propelling the sprayed drops of soap stock and the dried particles of the soap product resulting therefrom through and out of the drying apparatus by said current of drying gas, the said particles being carried in and by the said gas current whereby every particle is subjected to substantially identical treatment in passing through the drying tower and a uniform product is obtained, regulating the relative amounts and temperatures of the liquid soap stock and the drying gas to produce an ultimate product of the desired moisture content and collecting the particles of the finished soap product from the current of reduced temperature spent drying gas issuing from the drying tower.

4. The process of manufacturing a soap product in powder form which comprises preparing a soap stock containing all of the ingredients of the ultimate soap product in condition sufficiently liquid so that it can be disintegrated to a reasonably uniform finely divided condition in suspension in a gaseous drying medium, effecting such disintegration in a current of heated drying gas by atomizing to thereby effect evaporation of moisture from the said stock and reduce it to the form of solidified apparently dry particles in suspension in the said gas, producing a positive and controlled movement of the finely divided soap stock through the drying apparatus by entrainment thereof in the said current of the gaseous medium to thereby effect substantially uniform drying of the respective soap particles, the evaporation of moisture therefrom taking place while the material is in finely divided suspension in the gas, restricting the drying action when the material has reached an appropriate moisture content and reducing the temperature of the particles of the material to a degree appropriate for effecting solidification and facilitating handling by introducing to the heated gas current carrying the said particles in suspension a quantity of cooler gas and then separating and collecting the said particles of the soap product from the resulting gas current of reduced temperature.

5. The process of manufacturing a soap product in the form of a powder wherein the component particles are of generally spherical shape which comprises preparing a soap and water solution having a relatively low percentage of solids so that the said solution is free-flowing in the sense of a true liquid, spraying the said soap solution in the form of fine generally globular drops into a heated drying gas to effect evaporation and absorption of the major portion of the water content thereof, whereby the solids contained in the respective sprayed drops of the said soap solution are reduced to substantially dry condition in generally spherical small independent shapes, and then separating and collecting from the said gas the dried generally spherical soap particles to form the finished powder soap product.

6. A spray dried soap product which is light bulking, is of uniform texture, is free from grit as evidenced by rubbing between the fingers, is readily soluble in water and is composed of soap particles which, as they appear under the microscope, are of generally rounded spherical form, characterized by the substantial absence of angular formations.

7. A soap spray dried product composed essentially of particles which are generally spherical in shape and are characteristically hollow particles in the general nature of small heavy walled soap bubbles from which the moisture has been removed so that the bubbles assume a solidified substantially dry form.

In testimony whereof I affix my signature.

ROBERT L. HOLLIDAY.

CERTIFICATE OF CORRECTION.

Reissue Patent No. 16,749. Granted March 27, 1927, to

ROBERT L. HOLLIDAY.

It is hereby certified that error appears in the printed specification of the above numbered patent requiring correction as follows: Page 1, line 21, for the misspelled word "coap" read "soap" and line 69, for the word "atmposphere" read "atmosphere"; page 3, line 75, strike out the word "in"; page 6, line 26, claim 7, for the words "A soap spray dried" read "A spray dried soap"; and that the said Letters Patent should be read with these corrections therein that the same may conform to the record of the case in the Patent Office.

Signed and sealed this 25th day of October, A. D. 1927.

M. J. Moore,
Acting Commissioner of Patents.

Seal.

DISCLAIMER.

Reis. 16,749.—*Robert L. Holliday*, New York, N. Y. Manufacture of a Finely-Divided Dry Soap Product. Patent dated September 27, 1927. Disclaimer filed October 9, 1928, by the assignee, *Industrial Spray Drying Corporation.*

Hereby enters this disclaimer to certain of the process claims of the above identified reissue patent, namely, claims 1, 2, 3, and 4, excepting when in the process claimed the step of preparing the soap stock involves adding water to the ordinary soap of regular commercial manufacture for preparing the soap in the form of a free-flowing liquid stock so that it may be sprayed into the form of fine drops.

[*Official Gazette October 23, 1928.*]

spherical shape which comprises preparing a soap and water solution having a relatively low percentage of solids so that the said solution is free-flowing in the sense of a true liquid, spraying the said soap solution in the form of fine generally globular drops into a heated drying gas to effect evaporation and absorption of the major portion of the water content thereof, whereby the solids contained in the respective sprayed drops of the said soap solution are reduced to substantially dry condition in generally spherical small independent shapes, and then separating and collecting from the said gas the dried generally spherical soap particles to form the finished powder soap product.

6. A spray dried soap product which is light bulking, is of uniform texture, is free from grit as evidenced by rubbing between the fingers, is readily soluble in water and is composed of soap particles which, as they appear under the microscope, are of generally rounded spherical form, characterized by the substantial absence of angular formations.

7. A soap spray dried product composed essentially of particles which are generally spherical in shape and are characteristically hollow particles in the general nature of small heavy walled soap bubbles from which the moisture has been removed so that the bubbles assume a solidified substantially dry form.

In testimony whereof I affix my signature.

ROBERT L. HOLLIDAY.

CERTIFICATE OF CORRECTION.

Reissue Patent No. 16,749. Granted March 27, 1927, to

ROBERT L. HOLLIDAY.

It is hereby certified that error appears in the printed specification of the above numbered patent requiring correction as follows: Page 1, line 21, for the misspelled word "coap" read "soap" and line 69, for the word "atmposphere" read "atmosphere"; page 3, line 75, strike out the word "in"; page 6, line 26, claim 7, for the words "A soap spray dried" read "A spray dried soap"; and that the said Letters Patent should be read with these corrections therein that the same may conform to the record of the case in the Patent Office.

Signed and sealed this 25th day of October, A. D. 1927.

M. J. Moore,
Acting Commissioner of Patents.

Seal.

DISCLAIMER.

Reis. 16,749.—*Robert L. Holliday*, New York, N. Y. Manufacture of a Finely-Divided Dry Soap Product. Patent dated September 27, 1927. Disclaimer filed October 9, 1928, by the assignee, *Industrial Spray Drying Corporation.*

Hereby enters this disclaimer to certain of the process claims of the above identified reissue patent, namely, claims 1, 2, 3, and 4, excepting when in the process claimed the step of preparing the soap stock involves adding water to the ordinary soap of regular commercial manufacture for preparing the soap in the form of a free-flowing liquid stock so that it may be sprayed into the form of fine drops.

[*Official Gazette October 23, 1928.*]